United States Patent [19]

Van Mechelen

[11] 4,238,171

[45] Dec. 9, 1980

[54] RECIPROCATING WIND ENGINE

[76] Inventor: Bernard Van Mechelen, 704 Bertsch Ave., Crescent City, Calif. 95531

[21] Appl. No.: 20,118

[22] Filed: Mar. 13, 1979

[51] Int. Cl.³ .............................................. F03D 5/04
[52] U.S. Cl. .......................................... 416/67; 415/4
[58] Field of Search ...................... 416/65, 66, 67, 68; 417/334; 415/4; 60/398; 91/401; 290/43, 44, 54, 55

[56] References Cited

U.S. PATENT DOCUMENTS

| 648,442 | 5/1900 | Scott | 415/4 |
|---|---|---|---|
| 890,440 | 6/1908 | McIntyre | 416/80 |
| 905,859 | 12/1908 | Emrick | 416/67 |
| 969,587 | 9/1910 | Williams | 415/3 |

Primary Examiner—Leonard E. Smith
Attorney, Agent, or Firm—Jones, Tullar & Cooper

[57] ABSTRACT

A reciprocating wind engine utilizing plural, movably mounted sets of panels to form pistons is disclosed. Cooperating first and second pistons may be spaced from each other on either side of a central crankshaft. As the wind strikes the surface of a first set of panels, the first piston is moved toward the crankshaft and the second piston is pulled toward the crankshaft from the opposite side. When both pistons are adjacent the crankshaft, the panels on the first or windward piston open to allow the wind to pass therethrough into contact with the panels of the second piston which are closed to present a uniform surface to the wind. The pistons are forced away from the crankshaft to complete one cycle of operation. The output from the crankshaft may be utilized to generate electricity, or for any other suitable purpose. Plural engine segments may be cooperatively joined together to form a bank of such units.

15 Claims, 7 Drawing Figures

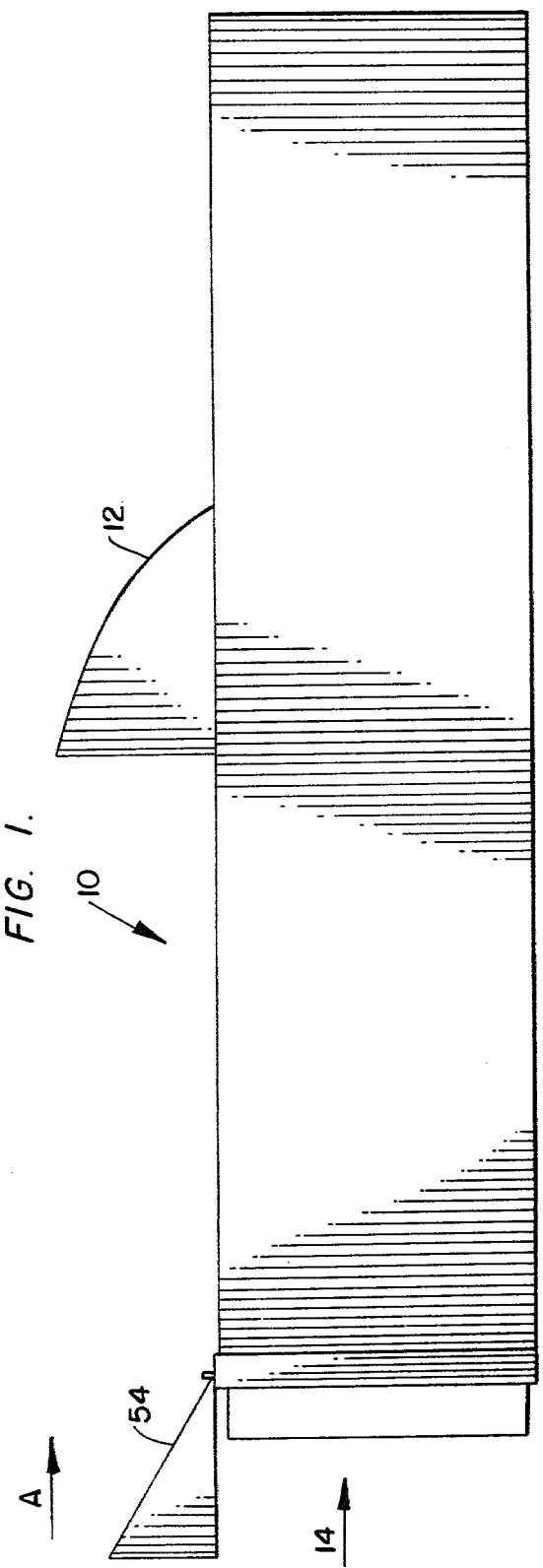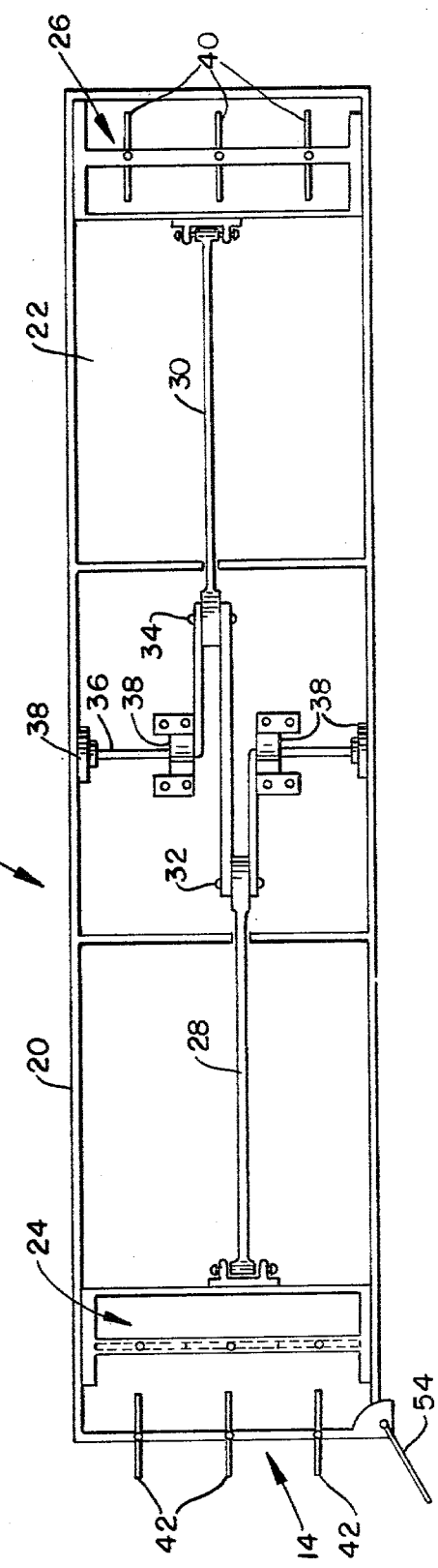

RECIPROCATING WIND ENGINE

FIELD OF THE INVENTION

The present invention is directed generally to a wind powered engine. More particularly, the present invention is directed to a reciprocating wind engine having plural cooperating wind engaging segments which turn a crankshaft. Most specifically, the present invention is directed to a reciprocating wind engine having plural pistons each of which is provided with a wind engaging surface having a plurality of pivotable panels. The panels which form the face of each piston are pivotable through 90° by suitable means to present either a flat, unbroken surface for contact with the wind, or an open surface through which the wind passes with little or no resistance. The operation of the panels on each set of cooperating pistons is coordinated so that the wind contacts the set of panels on a first piston and then the set of panels on a second piston, the panels of the first piston having opened to allow the wind to pass therethrough. This opening and closing of the panels in an alternating sequence allows the pistons to move towards and away from a central crankshaft to which they are connected. The crankshaft is caused to rotate by the motion of the pistons and this rotation is converted into useful work such as generating electricity, pumping water into irrigation ditches or the like. Plural engine units can be placed side by side with their crankshafts joined. A suitable wind flow controlling assembly is also provided to regulate the flow of air which is allowed to contact the pistons.

DESCRIPTION OF THE PRIOR ART

Wind has been used as a source of power since earliest time. Whether to move sailing ships or to turn windmills, wind has supplied energy for man to adapt to his use. Probably the best known wind-powered device is the windmill which has found useage in generating electricity, in pumping water and in many other applications. The conventional windmill uses a plurality of vanes or blades which extend radially outwardly from a central hub. A shaft is driven by this central hub and the shaft's output is then used as desired. The windmill must be quite large to be effective and requires a large space for the blades to turn in. The essential operational characteristics of the windmill are quite well known and this device has had a lengthy existance.

The recently intensifying demand for new sources of energy, brought about by shortages in oil and other fuels, has created new interest in the use of wind as an energy source. Recent U.S. patents have issued on devices which use the wind. One of these is U.S. Pat. No. 3,892,501 to Hillman which shows a wind motor in which the vanes are driven about a generally rectangular path and are rotated by contact with the wind. In U.S. Pat. No. 3,895,236 to Herron, there are shown several embodiments of a wind sail having panels or ports which will allow flow therethrough in only one direction. U.S. Pat. No. 3,995,972 to Nassar is also generally similar and shows a reciprocating blade wind machine. The blade moves up and down in a frame and changes its angle into the wind at each end of its travel.

The recent devices for using the wind have recognized the problems of size and efficiency of the windmill and have attempted to provide wind powered devices which require smaller space and which produce more energy than the windmill. Such a result has not always been attained and some of the more recent wind power devices have been complex and costly while at the same time being undependable and not overly efficient.

SUMMARY OF THE INVENTION

It is an object of the present invention to provide a reciprocating wind engine.

Another object of the present invention is to provide a reciprocating wind engine having spaced pistons.

A further object of the present invention is to provide a reciprocating wind engine in which the pistons are formed of pivotable wind panels.

Yet another object of the present invention is to provide a reciprocating wind engine which includes a wind flow control assembly.

Still a further object of the present invention is to provide a reciprocating wind engine which may have its output crankshaft joined to other similar crankshafts to compound the energy of the engines.

As will be set forth in greater detail in the description of preferred embodiments as set forth hereinafter, the reciprocating wind engine in accordance with the subject invention is comprised generally of a pair of spaced, reciprocating pistons each of which is connected to a crankshaft by a suitable connecting rod. The pistons each have faces which are formed by several pivotable panels that can rotate through approximately 90°. The two pistons move towards and away from each other and the central crankshaft by the exertion of the force of the wind against the panels which form the faces of the pistons. In operation, the face of the windward piston is closed and the wind forces the piston toward the crankshaft. The face of the second or leeward piston is open and this second piston is drawn toward the crankshaft. When the two pistons reach their closest points of adjacency to the crankshaft, suitable means open the panels in the face of the first piston and close the face of the second. The wind now passes through the first piston to contact the second one's face thus forcing the pistons away from the crankshaft. As the pistons reach their point furthest away from the crankshaft, the faces again change with the first closing and the second opening. The wind now again causes the pistons to move toward the crankshaft and the cycle repeats itself.

The rotation of the crankshaft can be used to generate electricity, pump water, operate machinery or the like. Several of the reciprocating wind engine units can be joined together and their crankshafts interconnected to increase the capabilities of the device. The reciprocating pistons are contained generally in a box-like chamber and an air scoop may be used to provide additional airflow to the leeward piston's face. A wind flow control apparatus is secured to the reciprocating wind motor on its windward side. This control apparatus is provided with a plurality of moveable panels and a suitable control means such as a wind vane which controls the magnitude of the wind force hitting the panels.

The reciprocating wind engine in accordance with the present invention is adaptable to a number of uses. It can be incorporated into the upper portions of a tall building in combination with other such devices to power generators for the electricity used by the building. It can be used either as a single unit or ganged with other units to provide power for any application where a turning shaft is required. In contrast to prior devices, the reciprocating wind engine in accordance with the present invention does not require an exceptionally large amount of space, is not complex, and can be easily joined with or removed from contact with other similar devices to change the amount of power provided. Friction losses can be kept at a minimum through the use of proper bearings and the engine is quite effective in converting wind motion to the rotating motion of a crankshaft.

BRIEF DESCRIPTION OF THE DRAWINGS

While the novel features of the reciprocating wind engine in accordance with the present invention are set forth with particularity in the appended claims, a full and complete understanding of the reciprocating wind engine may be had by referring to the description of preferred embodiments set forth hereinafter and as may be seen in the accompanying drawings in which:

FIG. 1 is a schematic side elevation view of a first preferred embodiment of a reciprocating wind engine in accordance with the present invention;

FIG. 2 is a schematic top plan view of the reciprocating wind engine of FIG. 1 with the top removed;

DESCRIPTION OF PREFERRED EMBODIMENTS

Figure 3:
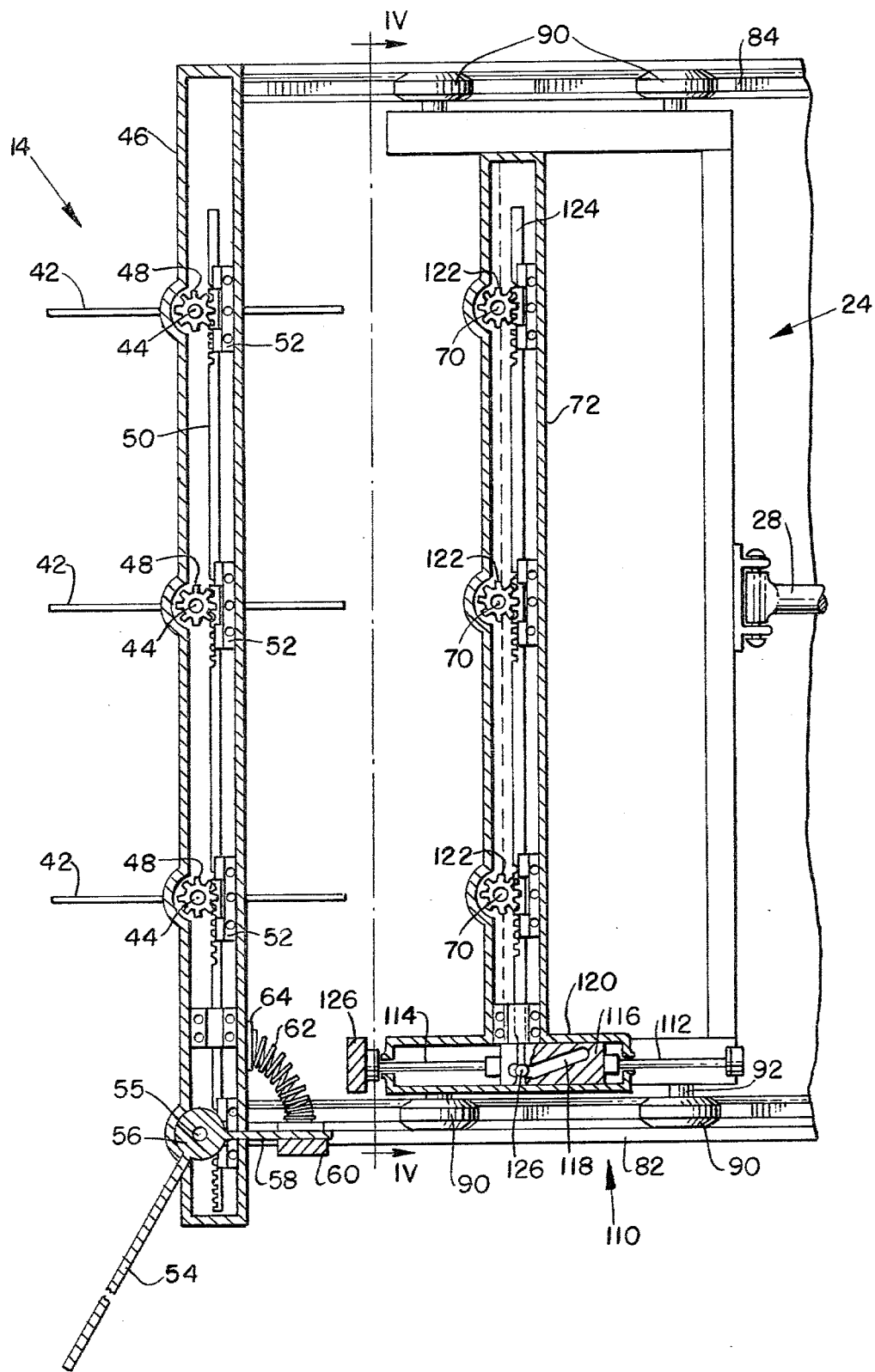
FIG. 3 is a top plan view, partly in section, of the left side of the reciprocating wind engine as seen in FIG. 2, and having portions removed for clarity.

Turning now to FIG. 1, there may be seen generally at 10 a first preferred embodiment of a reciprocating wind engine in accordance with the present invention. As may be seen in FIG. 1, engine 10 is a generally rectangular housing having a wind or air scoop 12 which supplies additional air to the interior of engine 10. It will be assumed that the wind is coming from left to right, as indicated by arrow A in FIG. 1. Reciprocating wind engine 10 is further provided with a wind flow control assembly, generally at 14, whose structure and operation will be discussed in greater detail hereinafter. It will be understood that the representation of reciprocating wind engine 10 in FIG. 1 is schematic and that while the rectangular shape is preferred, the engine could have various other shapes as desired. It will also be understood that plural engines could be placed side by side with their crankshafts joined to each other. Further, means could be provided either for mounting an engine on a rotatable platform to facilitate movement in response to wind direction changes or for utilizing selectively positioned engines depending on the wind direction. It will also be understood that the wind engine is intended for use in a number of applications. For example, a bank of engines could be placed on the top of a tall building with their output connected to a shaft of an electric generator. Or an engine could be used to operate a pump to pump water into an irrigation ditch. Wherever the wind blows and power is required, the reciprocating wind engine in accordance with the present invention could find use.

Turning now to FIG. 2, there may be seen a top view of the wind engine 10 with the scoop 12 and the top of the device removed. It will be understood that FIG. 2 is also a somewhat schematic view and shows only the general structure of the engine 10. Analogyzing wind engine 10 to an internal combustion engine, wind engine 10 includes a pair of spaced elongated cylinders 20 and 22, respectively. Cylinder 20 will be designated as the windward cylinder and cylinder 22 as the leeward cylinder. Each cylinder carries a movable piston assembly 24 and 26 in windward and leeward cylinders 20 and 22, respectively. Each of these piston assemblies is connected to a first end of connecting rods 28 and 30 with these connecting rods being connected, at their second ends, to journals 32 and 34, respectively of a central crankshaft 36 which is suitably supported by spaced bearings 38.

Each piston 24 and 26 has a face comprised of a plurality of pivotable panels 40 which are caused to rotate through 90° by a suitable means which will be discussed hereinafter. In operation, wind passes through open panels 42 in the wind flow control assembly 14, whose operation will also be discussed hereinafter. This wind will contact panels 40 on the face of windward piston 24 and will cause piston 24 to move to the right, as seen in FIG. 2. Movement of piston 24 to the right causes the crankshaft 36 to rotate and to draw leeward piston 26 to the left. The panels on leeward piston 26 are open to minimize wind resistance. As the two pistons reach the inner end of their travel in cylinders 20 and 22, the panels on pistons 24 and 26 switch orientation. The panels on windward piston 24 open and those on leeward piston 26 close so that the wind force which has pushed the windward piston inwardly now passes through the windward piston's now open panels and contacts the now closed panels on leeward piston 26. Leeward piston 26 is thus forced outwardly or to the right and windward piston returns to the left. Additional wind is supplied through scoop 12 which is in communication with leeward cylinder 22. As the pistons reach their outer limits of travel, the position of the panels again changes and the next cycle starts.

Turning now to FIG. 3, there is shown a top plan view, partly in section and showing the wind flow control assembly 14 and the windward piston assembly 24. Referring first to the wind flow control assembly 14, there are provided a plurality of pivotable panels 42 whose purpose is to direct and control the wind entering the wind engine 10 and contacting, initially, the panels 40 of windward piston 24. Each of the panels 42 is carried on a vertical shaft 44 which is suitably supported by bearings or the like (not shown) in upper and lower horizontal frame members 46. Each shaft 44 carries a gear 48 which engages a toothed portion of a rack gear 50. Rack gear 50 is slidably supported by spaced supports 52 that are secured in any desired manner to the upper horizontal frame member 46. A regulating wind vane 54 is carried on a central hub 55 which, in turn, is secured to a rotatable shaft 56 that also carries a suitable gear (not shown) which meshes with rack gear 50. A control arm 58 extends from hub 55 in a direction generally perpendicular to frame member 46. Control arm 58 is prevented from moving in one direction by a suitable stop 60, which is secured to the frame of engine 10. Movement of control arm 58 in a second direction is resisted by a coil spring 62 which abuts arm 58 on one end with its second end being secured in a suitable seat 64 carried by upper horizontal frame member 46.

In the operation of control assembly 14, the wind vane 54 will be struck by the wind which blows generally as indicated by arrow A in FIG. 1. As may be seen in FIG. 3, the force of the wind will tend to force vane 54 in a counterclockwise direction about shaft 56. This motion is counteracted by the strength of spring 62. As vane 54 moves, shaft 56 is rotated and causes rack gear 50 to slide thus changing the direction of panels 42. If the force of the wind becomes excessive, panels 42 will be forced closed thereby shutting off the wind flow to the engine. It will be seen that this arrangement thereby operates to regulate the wind flow to the engine and to maintain it as constant as possible. As the wind speed increases, the panels start to close with the net result being a constant wind force to the pistons.

Figure 4:
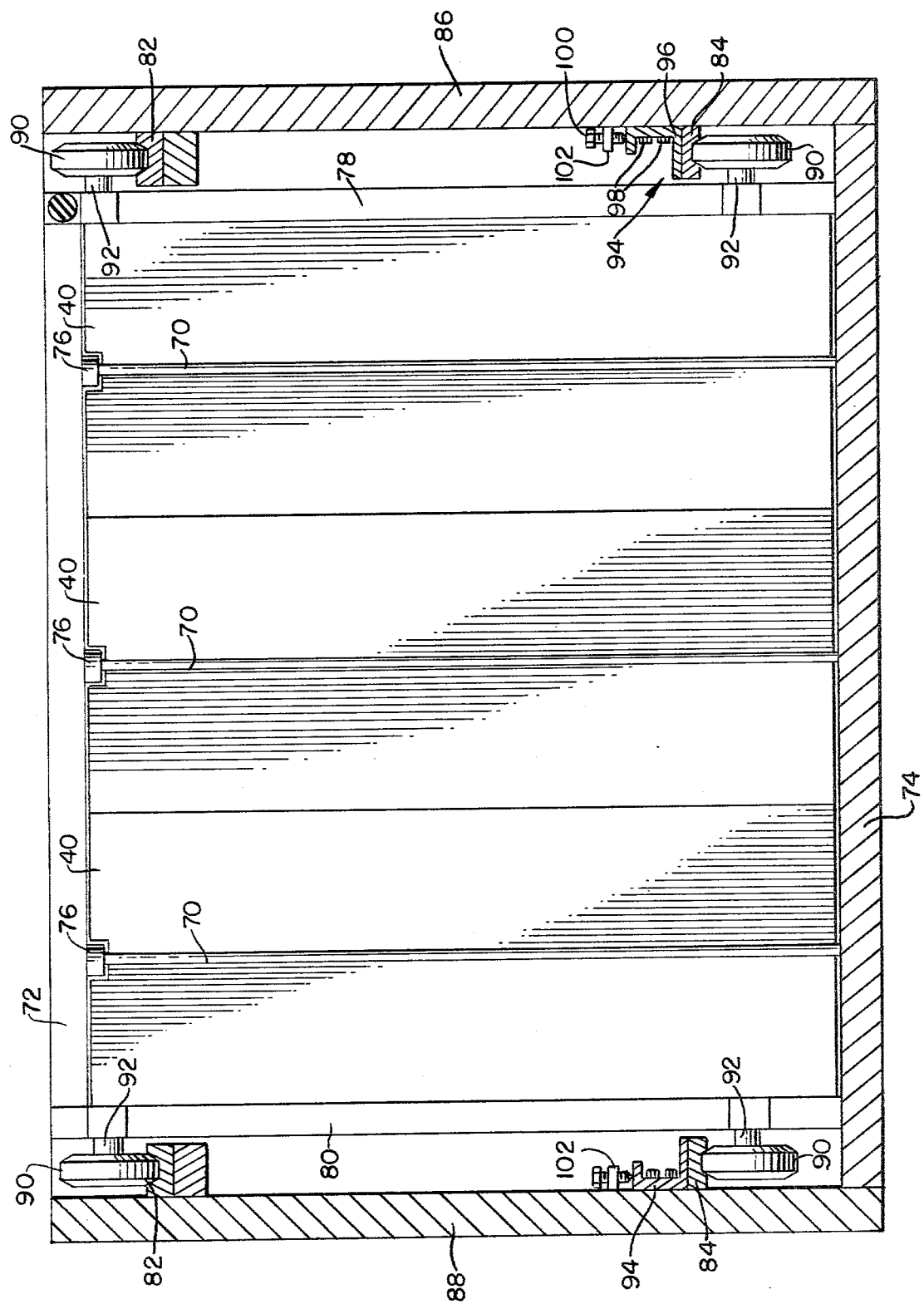
FIG. 4 is an elevation view taken along line IV—IV in FIG. 3.

Turning again to FIG. 3 and to FIG. 4, windward piston assembly 24, which is exemplary also of leeward piston assembly 26, is comprised of a plurality of lightweight panels 40 which form the face of the piston. Each panel 40 is secured to a vertical shaft 70 which is carried in upper and lower frame members 72 and 74, respectively, as seen in FIG. 4. It will be understood that shafts 70 are carried by suitable bearings such as shown at 76 and that panels 40 are fabricated to be lightweight while retaining sufficient strength to avoid being bent or twisted by the wind force. Side frame members 78 and 80 connect with upper and lower frame members 72 and 74 to form a generally rectangular support frame for the piston face panels 40. The frame is, in turn, supported in upper and lower tracks 82 and 84, which are secured to side members 86 and 88 of the engine 10, by wheels 90. Each of the wheels 90 is supported on a stub axle 92 which extends outwardly from the side frames 78 and 80. Each piston assembly is thus supported for reciprocatory motion by its wheels 90 running in tracks 84. As may be seen in FIG. 4 suitable adjusting means 94 may be provided to adjust the position of one or more of the wheel tracks. This adjusting means may include a channel member 96 to which the track 84 is secured and which is, in turn, secured to side member 86 by bolts 98 that pass through elongated slots (not shown) in channel member 96. An adjusting bolt 100 may be threaded through a supporting tab 102 to contact channel member 96. By tightening or loosening bolt 100, the spacing of track 84 with respect to track 82 can be varied to insure that the tracks are properly spaced.

Figure 5:
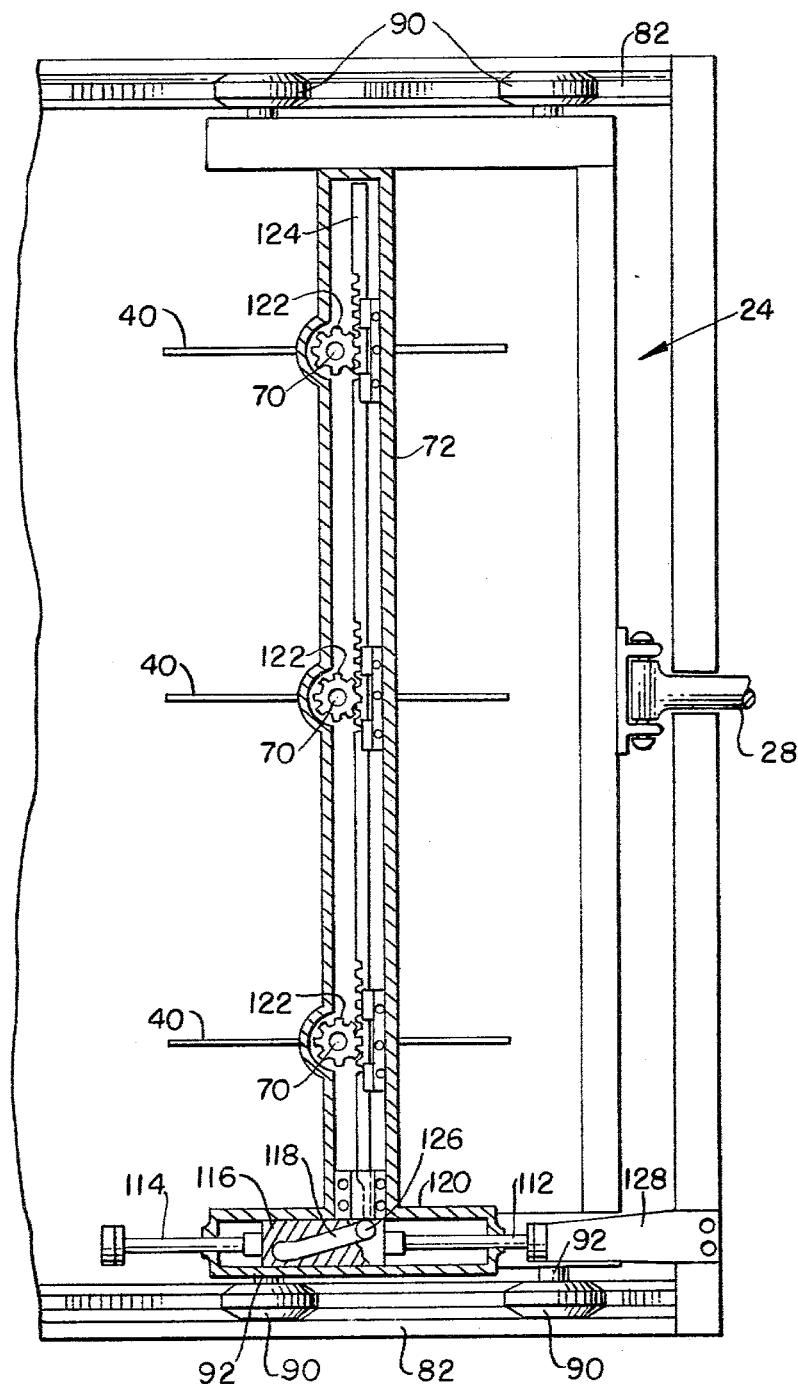
FIG. 5 is a top plan view, partly in section, generally similar to FIG. 3, but with the piston at the bottom dead center position of its stroke.

Returning to FIG. 3, there may be seen a shifting assembly generally at 110 for causing the piston face panels 40 to open or close. Opposed shifting rods 112 and 114 extend rearwardly and forwardly from a slidable shifting shoe 116 which is formed with a diagonal slot 118. Shifting shoe 116 is slidably carried in an upper longitudinal frame chamber 120 that defines the limits of motion of shoe 116. The piston panels 40 are, as discussed previously, supported on shafts 70 which have gears 122 secured thereto. These gears mesh with a slideable rack gear 124 in a manner similar to the rack gear 50 used in the wind flow control assembly 14. The free end of rack gear 124 extends beyond upper frame member 72 and terminates in a pin 126 which is located in slot 118 of shifting shoe 116. FIGS. 3 and 5 show the windward piston assembly at the ends of its stroke and show the operation of the shifting assembly 110 to vary the position of panels 40. In FIG. 3, the front shift rod 114 is in contact with a front shift stop 126 to force shifting shoe 116 to the rear thereby pulling rack gear 124 to the right to close the piston panels 40. In FIG. 5, it will be seen that the windward piston assembly 24 has traveled to the rear of its stroke where rear shift rod 112 contacts a rear shift stop 128 to force shift shoe 116 forward thus moving rack gear 124 to the left to open the piston panels 40 for the return cycle. The operation of the leeward piston is essentially the same with the exception that the shift shoe's slot is reversed so that the piston panels close at their inner limit of travel of the piston assembly and open at the outer limit of piston travel, as is shown in FIG. 2.

Summarizing the operation of this first preferred embodiment of a reciprocating wind engine, the wind is allowed to flow through panels 42 of the wind flow control assembly 14. The wind flow to the windward piston is maintained constant by the movement of wind vane 54 which controls the opening of the panels 42. The wind then strikes the closed panels 40 of the windward piston assembly 24 to drive this piston to the right, as seen in FIG. 2. Piston assembly 24 is supported by wheels 90 riding in upper and lower tracks 82 and 84. The motion of piston assembly 24 is communicated to crankshaft 36 by a connecting rod 28 which is suitably secured to windward piston assembly 24. As this piston assembly moves to the right, the leeward piston assembly 26, whose panels have been opened by shifting assembly 110, is pulled to the left by its connecting rod 30 which is also secured to crankshaft 36. When the two pistons are closest to each other, their respective shifting assemblies open the panels on windward piston assembly 24 and close the panels on leeward piston assembly 26. The wind force now passes through piston 24, hits piston 26, is augmented by wind coming in through scoop 12, and forces the pistons apart thereby continuing the rotation of crankshaft 36 whose output can be used in any desired manner.

Figure 6:
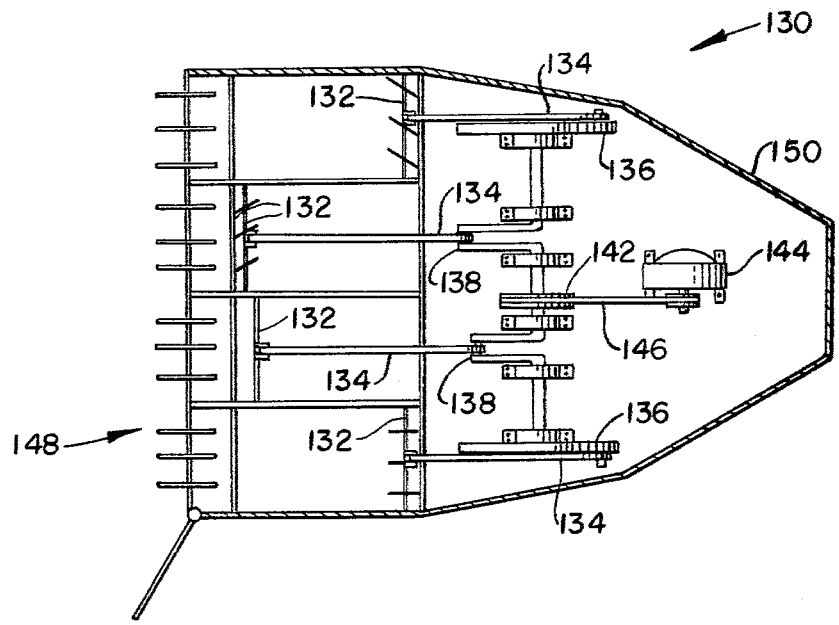
FIG. 6 is a schematic top plan view, with portions removed, of a second preferred embodiment of a reciprocating wind engine in accordance with the present invention.
Figure 7:
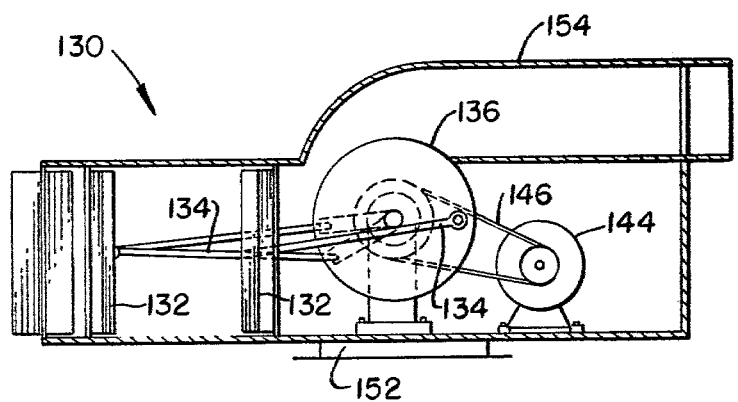
FIG. 7 is a side elevation view, with portions removed for clarity, of the reciprocating wind engine of FIG. 6.

A second preferred embodiment of a reciprocating wind engine in accordance with the present invention is shown generally at 130 in FIGS. 6 and 7. As may be seen in FIG. 6, a plurality of piston assemblies 132 are placed side by side, which is in contrast to the first embodiment which showed opposed pistons. Each piston is otherwise the same as the pistons discussed previously in terms of its mounting and operation. Each piston has a connecting rod 134 with the outer two pistons, as seen in FIG. 6, being connected to flywheels 136 and the inner pistons being connected to journals 138 of crankshaft 140 which is also joined to flywheels 136. Crankshaft 140 carries a pulley wheel 142 which is joined to a conventional generator 144 by suitable belts 146. A wind flow control assembly 148 is carried in front of the pistons 132 and is the same in structure and function as the corresponding assembly 14 discussed in connection with the first preferred embodiment.

In FIG. 7 there may be seen a schematic rule elevation view of the second preferred embodiment of a reciprocating wind engine with portions removed for clarity. This assembly is mounted on a platform 150 which can move on a base 152 to reposition itself as the wind changes. A wind vane 154 is carried by reciprocating wind engine 130 and acts to maintain the engine headed into the wind. As the wind direction changes, the engine 130 will be rotated on its base 152 so that it maintains the wind flow control portion 148 of the engine pointed into the wind. The schematic view of FIG. 7 shows two pistons. It will be understood that this a schematic view and that the necessary supporting wheel tracks, frame structures, and the like have been omitted for convenience since FIGS. 6 and 7 are intended only to show the concept of operation of this reciprocating wind engine 130 and not the structural specifics which are the same as those previously described in connection with the first preferred embodiment. This embodiment would be particularly useful in an application where the wind direction was variable or where space limitations preclude the placement of several motors in different directions.

While there have hereinabove been fully and completely disclosed first and second preferred embodiments of a reciprocating wind engine in accordance with the present invention, it will be obvious to one of skill in the art that a number of changes could be made. For example the shape of the pistons and panels, the types of materials used, the number of wheels which carry each piston assembly, the shape of the wind control vane, the structure of the crankshaft and connecting rods, the arrangement of bearings, and the like are changes which could be made without departing from the true spirit and scope of the reciprocating wind engine in accordance with the present invention and accordingly, the invention is to be limited only by the appended claims.

I claim:

1. A reciprocating wind engine, said engine receiving wind energy and converting the wind energy into rotation of a shaft, said reciprocating wind engine comprising:

first and second spaced opposed piston assemblies secured to a central crankshaft, said first piston assembly being windward of said crankshaft and said second piston assembly being leeward of said crankshaft, each said piston assembly having a face formed by plural spaced rotatable panels;

a wind flow control assembly secured to said engine windwardly of said first piston assembly, said wind flow control assembly having movable control panels and a control wind vane;

a shifting shoe assembly carried by each said piston assembly and having forwardly and rearwardly extending shift rods, said shifting shoe assembly having a sliding slotted shifting shoe which moves a rack gear to effect rotation of said piston assembly panels when said shift rods abut stops;

a plurality of wheels secured to each said piston assembly, said wheels riding in spaced tracks secured to said engine to facilitate reciprocation of said piston assemblies; and connecting rods securing said piston assemblies to said crankshaft, whereby the wind energy supplied to said piston assemblies causes them to reciprocate and to rotate said crankshaft.

2. A reciprocating wind engine for receiving wind energy and for converting the wind energy into rotation of a shaft, said reciprocating wind engine comprising:

at least first and second pistons, each of said pistons having a face formed by plural spaced rotatable panels, said first and second pistons being opposed to each other;

means for directing and controlling wind flow to said pistons;

means for rotating said panels in response to the location of each said piston in said engine;

means for supporting each said piston for reciprocating motion; and a central crankshaft connecting said pistons wherein the wind energy supplied to said pistons will cause said pistons to reciprocate and turn said crankshaft.

3. The reciprocating wind engine of claim 2 wherein said rotatable panels rotate through generally 90° from a position perpendicular to the direction of wind flow when said piston is moving with the wind to a position generally parallel to the direction of wind flow when said piston is moving in opposition to the wind flow.

4. The engine of claim 2 wherein said first piston is upwind of said crankshaft and said second piston is downwind of said crankshaft.

5. The engine of claim 2 wherein said pistons move towards and away from each other.

6. The reciprocating wind engine of claim 2 wherein said pistons are supported by spaced wheels which ride in tracks secured to said engine.

7. The engine of claim 6 wherein said tracks are adjustably secured to a frame portion of said engine.

8. The reciprocating wind engine of claim 2 wherein said means for controlling wind flow to said pistons includes a plurality of rotatably mounted control panels positioned windwardly of said first piston.

9. The engine of claim 8 wherein each of said control panels is supported on a shaft, said shaft carrying a gear thereon, said gear meshing with a rack gear.

10. The engine of claim 9 wherein said rack gear is slidably carried in said wind flow controlling means and is caused to slide by movement of a control wind vane.

11. The engine of claim 10 wherein a coil spring is secured to said wind flow controlling means and opposes movement of said control wind vane.

12. The reciprocating wind engine of claim 2 wherein each said rotatable panel on said piston is carried on a shaft, said shaft carrying a gear thereon, said gear meshing with a piston rack gear.

13. The engine of claim 12 wherein said piston rack gear is slidably carried in said piston and is caused to slide by a shifting assembly.

14. The engine of claim 13 wherein said shifting assembly includes a slidable shifting shoe having shift rods extending forwardly and rearwardly in the direction of travel of said piston.

15. The engine of claim 14 wherein said shifting shoe includes a diagonal slot and said piston rack gear includes a pin at a first end thereof, said pin being positioned in said slot, said piston rack gear being moved as said shifting shoe slides in response to force exerted thereon by said shift rods striking abutments.

* * * * *